May 12, 1959 D. V. GERA 2,886,426
PROCESS FOR CONTINUOUSLY MANUFACTURING SUPERPHOSPHATE
Filed May 14, 1954
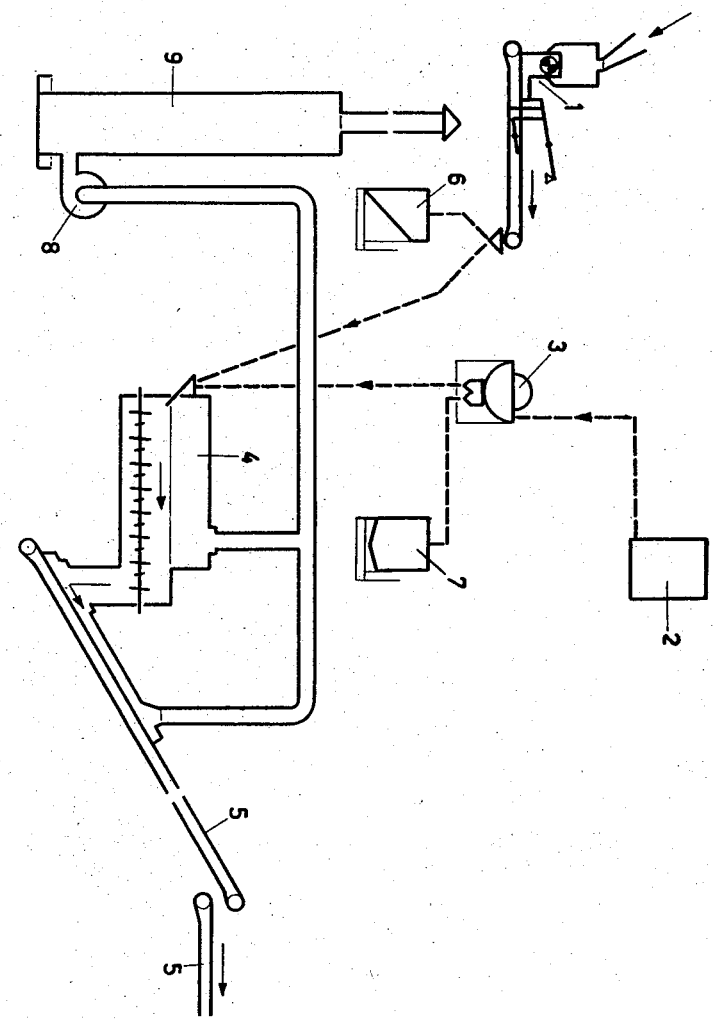
INVENTOR.
Delfino V. de Gera
BY Knight Bros.
Attorneys

United States Patent Office 2,886,426
Patented May 12, 1959

2,886,426

PROCESS FOR CONTINUOUSLY MANUFACTURING SUPERPHOSPHATE

Delfino Vola Gera, Milan, Italy, assignor to Montecatini-Società Generale per l'Industria Mineraria e Chimica, a corporation of Italy Application May 14, 1954, Serial No. 429,897

Claims priority, application Italy May 30, 1953

1 Claim. (Cl. 71—40)

This invention relates to methods and apparatus for continuously manufacturing superphosphate, and has for its principal object to eliminate the "den" needed with the conventional methods.

Within the recent past, processes for obtaining superphosphate have changed from batch operations to continuous operations which offer considerable advantages over the former.

In the early discontinuous system, practiced for nearly a century, successive charges of sulphuric acid and phosphorite in calculated amounts were intimately mixed for a few minutes and, upon discharge from the mixer in form of a fluid slurry, were transferred to brick-lined pits, called the "den," of a capacity sufficient to contain tens of tons of the product. The mixture was allowed to remain in these dens for many hours, viz. for a period of time necessary for the completion of the reactions and the removal of fluorine gases. Finally, when the mixture was discharged into storage rooms, it had practically attained its final composition and assumed the powdery form typical for superphosphate.

While the batch method of making superphosphate was still prevalent, the dens were given various types of improvements, but without attempt at modifying the basic process as such which, as mentioned above, included a long storage period for the completion of a number of reactions in the material stored in bulk. The required manufacturing plants had to be big and were uneconomical to build and maintain.

In the late twenties, a careful study of the reactions involved in the formation of superphosphate led to an entirely new concept of the process. One of the discoveries then made was that the reaction between the acid and the phosphate proceeds much more rapidly when the slurry leaving the mixer is divided into relatively small masses. This, among other findings, made it possible to devise a continuous process for superphosphate production in plants less expensive and more profitable in operation than batch-system plants.

The present invention constitutes an improvement in the continuous process for making superphosphate.

In order to clearly indicate the basic principles of the invention, it is necessary to summarize the reactions taking place when phosphorite is exposed to the action of sulphuric acid. These reactions may be divided into three categories:

(1) Reactions which proceed completely in the desired direction and give no rise to a chemical equilibrium, namely the reactions that cause the formation of gaseous and insoluble compounds, in the present case the reaction of sulphuric acid with carbonates and fluorides:

$$CaCO_3 + H_2SO_4 = CaSO_4 + H_2O + CO_2$$

$$CaF_2 + H_2SO_4 = CaSO_4 + 2HF$$

$$2CaF_2 + SiO_2 + 2H_2SO_4 = 2CaSO_4 + 2H_2O + SiF_4$$

and the reaction of sulphuric acid with tricalcium phosphate to form calcium sulphate and phosphoric acid:

$$Ca_3(PO_4)_2 + 3H_2SO_4 = 2H_3(PO_4)_2 + 3CaSO_4 \text{ (insoluble)}$$

(2) Reactions giving rise to a chemical equilibrium, namely the reaction or phosphoric acid with tricalcium phosphate to form mono- and dicalcium phosphates:

$$Ca_3(PO_4)_2 + 4H_3PO_4 = 3Ca(H_2PO_4)_2$$

$$2Ca_3(PO_4)_2 + 2H_3PO_4 = 6CaHPO_4$$

and the reaction of phosphoric acid with dicalcium phosphate to form monocalcium phosphate:

$$CaHPO_4 + H_3PO_4 = Ca(H_2PO_4)_2$$

(3) Reactions of the formed salts in binding water of crystallization; they are:

The taking up of one molecule of water of crystallization by monocalcium phosphate, The taking up of two molecules of water of crystallization by dicalcium phosphate, The taking up of one half molecule of water of crystallization by $CaSO_4$ at first, and later one or two molecules.

A study of these three types of reaction formed the basis for the process according to the invention resulting in a remarkable speed-up of the equilibrium reactions and the abolishment of the den. Laboratory and semi-industrial trials have shown that the first type of reactions can be completed in a few minutes, provided the following conditions are observed.

I. *Mixing.*—An intimate contact must be established of the acid-phosphorite mixture during all phases of the reaction. This aim is attained:

(a) By working with relatively small quantities (several hundred pounds);

(b) By a very fine grinding of the phosphorite to aid in the dispersion;

(c) By mixing the reacting slurry slowly and gradually to promote the evolution of gaseous products, and by applying a pressing and masticating action thus promoting the release of gas and preventing the formation of an excessively porous structure of the mass apt to reduce the reaction velocity.

II. *Elimination of gaseous reaction products.*—For the purposes of this invention, it is of great importance that both hydrogen fluoride and silicium fluoride be eliminated at once by absorption in an aspirator or other suitable device in order to prevent them from spreading through the reaction mass and subsequently contaminating the room where the superphosphate is stored. Aside from a good draft, the elimination of gas is aided by properly observing the operating conditions set forth under point I, and by controlling the temperature in such a manner that the product reaches the mixer outlet with a well defined heat content.

III. *Binding of water.*—As far as the third type of reactions is concerned, it is of utmost importance that the take-up of water of crystallization be practically completed before the superphosphate is stored, as usual in quantities of hundred thousands of pounds. A substantial water take-up during storage results in setting and baking together of the superphosphate which requires regrinding before shipping. In order to attain the desired conditions, the superphosphate must be sent to storage at a temperature below 70 to 75° C., preferably at 50 to 60° C., since only below such temperature can water of crystallization be taken up during a relatively long period of time.

By operating according to the herein-disclosed process, even the reactions of the second type reach their ultimate equilibrium only after some time, up to several weeks, depending upon the reaction rate. It must be remembered in this connection that a temperature increase of approximately 10° C. doubles the reaction rate. However, this factor cannot be utilized beyond certain limits for rapidly establishing the chemical equilibrium, since an excessively high temperature prevents the take-up of water of crystallization (third reaction). From the knowledge gained by studying the above-mentioned reactions, the basic requirements of the new process can be stated as follows:

(A) Fluorine and other gases are caused to develop in the mixer within a very short time, so that they can be completely removed by suction at the mixer outlet.

(B) Reactions resulting in a chemical equilibrium between phosphoric acid and mono-, di- and tricalcium phosphates are caused to occur substantially within the mixer, to go to completion during the subsequent storage of the superphosphate. At this second step, the temperature must be regulated so that the heat evolving during the exothermic reactions within the mass of superphosphate does not increase above 50 to 60° C. but preferably remains at about 40 to 45° C., in view of the reaction considered next.

(C) The reaction product is placed in storage at a temperature not higher than 50 to 60° C., so that anhydrous calcium sulphate formed by the reaction between sulphuric acid and phosphorite has been substantially converted to crystalline dihydrate, because, if the product were to be stored in the anhydrous state, this change would occur during storing and would result in hard, agglomerated masses. When this occurs, the masses must be ground and disintegrated before shipping. Care must be taken to properly coordinate the conditions set forth under (B) and (C) since, at a temperature increase beyond 60° C. inside the pile, the water of crystallization of compounds such as $CaSO_4 \cdot 2H_2O$—$Ca(HPO_4)_2 \cdot H_2O$—$CaHPO_4 \cdot 2H_2O$ is set free and again bound at decreasing temperature, thus causing a reoccurrence of undesired setting.

On the basis of semi-industrial trials, the following procedure was found to be most practical:

Finely ground phosphorite and sulphuric acid at a suitable ratio are introduced continuously into a mixer answering the requirements listed under point I. For example, such a mixer may be of the type described in the booklet "Superphosphate Continuous Manufacture—Montecatini System," by Giacomo Bellinzoni, which refers to the Italian Patents No. 369,796 (January 19, 1939), No. 383,092 (April 17, 1940), and No. 447,539 (June 23, 1938). In principle, the mixer is a slowly-operating device having two horizontal shafts provided with suitably arranged retarding and propelling blades rotating in opposite directions about their axis at adjustable speed.

A substantial feature of this process is the newly discovered condition that the mass must be masticated slowly so as to avoid an excessively porous structure thereof. In other words, the reaction material is preferably acted upon by blades of the screw-conveyor type so that both the acid and the phosphorite remain in intimate contact with each other, while, at the same time, a violent motion of the mixture is avoided. Any violent motion will greatly delay the transition from the liquid to the solid phase because of the thixotropic properties of newly forming superphosphate. A solid state of the reaction mixture is obviously necessary so that the product can be conveyed from the outlet of the mixing screw-conveyor by any device suitable for conveying solids. There are other conditions which must be observed during the mastication. Thus, the reacting mass should remain in the mixer no longer than two to ten minutes, depending upon the kind of phosphate being processed, upon the fineness of grind, the amount and concentration of acid, etc.; in short, depending upon all the factors that affect the development of the HF and $SiF_4$ gases and the facility of removal of these gases. Under these conditions, the equilibrium reactions occur up to about 75% within the mixer.

The suction or aspirator device is adjusted so as to remove, aside from the fluorine gases, a great part of the reaction heat and also part of the $H_2O$ in vapor form, to permit discharging the product at a temperature not higher than 50 to 60° C. and with a moisture content varying from about 16 to 20%, preferably 18 to 20%. If these conditions are observed, the equilibrium reactions proceed gradually and go to completion within a period of about twenty days to one month. The temperature inside the pile does not exceed 40 to 45° C. and remains nearly constant during that period since the heat losses within the large pile are negligible. By virtue of this heat reserve, the reactions can readily attain their final equilibrium, while they would stop much earlier at room temperature.

As far as the elimination of moisture is concerned, it should be noted that, as a result of only insignificant temperature changes, moisture is set free gradually in form of saturated vapors. These vapors permeate the entire superphosphate mass and, since they develop slowly, cause a physical disintegration of solid components.

The changes occurring in the final step are not only fostered by the somewhat increased temperature of the pile, but also by the intimate contact between the liquid phase (free phosphoric acid in the presence of saturated water vapor) and the solid phase (mono-, di- and tricalcium phosphates) representing the dispersion. This intimate reaction mechanism during storage results in a phosphorite breakdown efficiency of 99 to 99.5%, whereas, in the older processes, all other conditions being equal, the breakdown efficiency varied from 96 to 98%. Moreover, the physical properties of the product are entirely different from those of superphosphate obtained by prior processes. The product consists of a much finer powder, being lighter in color and more comparable to

*Superphosphate obtained from meal of Morocco 65% and Kafsa average 35%*

[Fineness: residue on 1350 mesh screen=10%. Masticated with 94% of 53° Bé. sulphuric acid. Output: 10,000 lbs. per hour.]

| | Immediate analysis | | Analysis of stored product | | | | | | | |
|---|---|---|---|---|---|---|---|---|---|---|
| | at mixer discharge | at storage entry | after 24 hours | after 48 hours | after 96 hours | after 6 days | after 10 days | after 15 days | after 20 days | after 1 month |
| Temperature_____° C__ | 75 | 55 | 30 | 40 | 45 | 48 | 43 | 40 | 38 | 36 |
| Moisture_____percent__ | 18.8 | 16.0 | 13.1 | 13.5 | 13.6 | 13.0 | 12.6 | 12.5 | 11.0 | 10.8 |
| Free acidity_____do____ | 14.5 | 12.0 | 5.4 | 5.1 | 5.2 | 4.7 | 4.3 | 4.1 | 3.8 | 3.6 |
| $H_2O$-soluble $P_2O_5$____do____ | 12.3 | 13.0 | 15.9 | 16.0 | 16.6 | 16.5 | 16.6 | 16.7 | 17.4 | 17.5 |
| Citric acid-soluble $P_2O_5$___do____ | 12.8 | 13.6 | 16.8 | 17.1 | 17.6 | 17.6 | 17.7 | 17.8 | 18.4 | 18.6 |
| Insoluble $P_2O_5$_____do____ | 4.8 | 4.3 | 1.6 | 1.5 | 0.8 | 0.9 | 0.6 | 0.5 | 0.2 | 0.1 |
| Total_____do____ | 17.6 | 17.9 | 18.4 | 18.6 | 18.4 | 18.5 | 18.3 | 18.3 | 18.6 | 18.7 |
| Breakdown yield_____do____ | 73.0 | 76.0 | 91.3 | 91.9 | 95.7 | 96.1 | 96.7 | 97.5 | 98.9 | 99.5 | superphosphate obtained by treating calcined bones. This light color is probably due to the high degree of fineness as well as to a complete elimination and destruction of organic substances normally present in phosphorite.

The above table shows a number of reaction data from the time the partly formed superphosphate leaves the mixer until it is completely finished.

The values given in the above table are averages. The tabulated results show that the process of this invention results in excellent breakdown yields, up to 99.5%, which are higher than the yields obtainable in conventional processes. In addition, the table illustrates the conditions and temperature requirements at various process stages.

The accompanying diagrammatic drawing illustrates an example of an apparatus assembly according to the invention for performing the process. It should be understood, however, that the apparatus may be modified in various ways so that the invention is not limited to the embodiment chosen for illustration.

Finely ground phosphate meal from a silo is conveyed by an elevator to a standard type continuous weight feeder 1. Sulphuric acid simultaneously passes from a storage tank 2 to a device 3, made of polyvinylchloride, for the continuous feed of a volumetrically measured amount of sulphuric acid. Weighing scales for a daily gravimetric control of phosphate meal and sulphuric acid are represented by 6 and 7, respectively. Meal and sulphuric acid go to the horizontal masticator-mixer 4. The mixer has a wide iron-plate casing internally lined with acid-proof material and is provided with one or more (generally two) shafts rotating in opposite directions. The shafts are adapted to be reversed and to be revolved at adjustable speed (25 to 50 r.p.m.) in order to regulate the residence time of the material within the mixer, depending upon the type and fineness of grind of the phosphate to be processed.

The shafts of the horizontal masticator-mixer 4 are provided with helical blades such as the blades of a screw conveyor, made from acid-proof material, arranged at different slopes so as to regulate the speed of advancement of the material toward the discharge. Thus, the masticator-mixer can be adjusted to meet the various time requirements, always with a view to mixing very slowly in order to avoid that, due to the thixotropic properties of partly formed superphosphate, the mixture remains in a fluid state (which results from too rapid stirring). That is, the slow speed of mixing promotes the conversion of the mixture to a solid product of sufficient stiffness to permit transfer to storage by means of a standard belt conveyor.

The casing of the horizontal mixer 4, made of sheet iron and lined with acid-proof material, is raised to form a hood in order to facilitate the removal of reaction gases.

For a continuous output of 12,000 lbs. of superphosphate having the desired characteristics, a mixer of 1 meter width, 0.80 meter height and 5 meter length, requiring about 15 horse power, has been found satisfactory.

The reacting mass is processed in the mixer for a time interval ranging from at least two to at most ten minutes, usually from four to eight or nine minutes, depending upon the time necessary for the complete removal of both hydrogen fluoride and silicium fluoride evolving during the mixing. The gases are drawn off by the aspirator-absorption means 8 and 9 so that the product reaches the mixer outlet in the solid state.

Aside from stirring the reacting mass in order to promote the development of gaseous products, the mixer-masticator must at the same time exert pressure upon the mass in order to prevent the latter from assuming a porous structure due to the gas formation and to retain the phosphorite and sulphuric acid in most intimate contact with each other. The removal of the reaction gases is controlled by the blower 8 which also removes a great portion of the reaction heat, so that the product at the mixer outlet has a temperature not higher than 80 to 90° C., and, upon storing, will have a temperature not higher than 50 to 60° C.

At the outlet of the mixer 4, the product is sufficiently solid to permit removal to storage by means of a belt conveyor 5, which can be mounted, if necessary, at a considerable incline (up to 40%).

After the product is placed in storage, the reactions between free phosphoric and sulphuric acid and mono-, di- and tricalcium phosphates go to completion and the superphosphate is converted from an initial (at mixer outlet) to final composition (after a one-month curing) as indicated in the illustrating example below:

|  | at mixer outlet | after 1 month storage |
|---|---|---|
| Temperature ° C | 75 | 36 |
| Moisture percent | 16–19 | 10–11 |
| Free $P_2O_5$ do | 14–14.5 | 3–3.5 |
| $H_2O$-soluble $P_2O_5$ do | 12–12.5 | 17–17.5 |
| $H_2O$— and citrate sol. $P_2O_5$ do | 12.5–12.8 | 18.2–18.5 |
| Insoluble $P_2O_5$ do | 4.5–5.0 | 0.1–0.2 |
| Total $P_2O_5$ do | 17.5–18 | 18.3–18.6 |

As apparent from the tabulated data, the product attains its final composition after a curing time of one month. The cured product is a dry, white, fine and very homogeneous powder, whose appearance is different from that obtained by other known processes, and which requires no subsequent grinding. In addition to eliminating the need for a "den," this being made possible by the fact that no further gas development occurs during storage, the process according to the invention offers the advantage of being readily adjustable to rapidly occurring changes. Moreover, the process permits the production of superphosphate on a large industrial scale without the necessity of extremely large size equipment since every process step is carried out in a very short time.

I claim:

A process for manufacturing pulverulent superphosphate, comprising mixing stoichiometric amounts of sulphuric acid and finely ground phosphorite and exposing the reaction mixture to a slow pressing and masticating action, for a period of two to about ten minutes to release all gaseous reaction products, the slow pressing and masticating being carried out by a stirrer rotated at 25–50 r.p.m., removing, during the pressing and masticating action, the hot water vapors and the gaseous reaction products, until said mixture has a temperature from 80 to 90° C. and a moisture content in the range 18–20% by weight, whereby immediately thereafter said reaction mixture leaves the mixer in a solid state, and the take-up of water of crystallization is substantially completed before the superphosphate is stored, transferring the solid mixture directly to storage, the solid mixture being cooled to a temperature within the range 50–60° C. while transferring it to storage and being stored at a median temperature of 40 to 45° C. for a period of several weeks until final equilibrium conditions are attained.

References Cited in the file of this patent

UNITED STATES PATENTS

| | | |
|---|---|---|
| 1,761,991 | Ober | June 3, 1930 |
| 1,837,328 | Ober | Dec. 22, 1931 |
| 1,837,331 | Ober | Dec. 22, 1931 |
| 1,871,416 | Broadfield | Aug. 9, 1932 |
| 1,959,973 | Wellisch | May 22, 1934 |
| 1,982,479 | Ober et al. | Nov. 27, 1934 |
| 2,136,793 | Gabeler et al. | Nov. 15, 1938 |
| 2,448,126 | Shoeld | Aug. 31, 1948 |
| 2,504,545 | Waring et al. | Apr. 18, 1950 |